United States Patent
Zhu et al.

(10) Patent No.: US 10,054,945 B2
(45) Date of Patent: Aug. 21, 2018

(54) METHOD FOR DETERMINING COMMAND DELAYS OF AUTONOMOUS VEHICLES

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 15/360,717

(22) Filed: Nov. 23, 2016

(65) Prior Publication Data
US 2018/0143632 A1 May 24, 2018

(51) Int. Cl.
| | |
|---|---|
| G05D 1/00 | (2006.01) |
| B60W 10/08 | (2006.01) |
| B60W 10/18 | (2012.01) |
| B60W 10/20 | (2006.01) |
| B60W 30/18 | (2012.01) |

(52) U.S. Cl.
CPC ........... *G05D 1/0088* (2013.01); *B60W 10/08* (2013.01); *B60W 10/18* (2013.01); *B60W 10/20* (2013.01); *B60W 30/18* (2013.01); *B60W 2400/00* (2013.01); *B60W 2710/0605* (2013.01); *B60W 2710/18* (2013.01); *B60W 2710/20* (2013.01)

(58) Field of Classification Search
CPC ................ G05D 1/0088; B60W 30/18; B60W 2400/00; B60W 2710/0605; B60W 2710/18; B60W 2710/20; B60W 10/08; B60W 10/18; B60W 10/20
See application file for complete search history.

(56) References Cited

U.S. PATENT DOCUMENTS

| | | | |
|---|---|---|---|
| 5,612,883 A | 3/1997 | Shaffer et al. | |
| 2002/0091460 A1* | 7/2002 | Allen | G05B 19/4166 700/173 |
| 2013/0274963 A1 | 10/2013 | Shue et al. | |
| 2015/0346718 A1* | 12/2015 | Stenneth | G06Q 30/0611 701/2 |

(Continued)

FOREIGN PATENT DOCUMENTS

| | | | | |
|---|---|---|---|---|
| EP | 2940545 A1 | * | 11/2015 | ............ B60W 30/00 |
| JP | 2013191138 A | * | 9/2013 | |

*Primary Examiner* — Tuan C To
(74) *Attorney, Agent, or Firm* — Womble Bond Dickinson (US) LLP

(57) ABSTRACT

In one embodiment, driving statistics of an autonomous vehicle are collected. The driving statistics include driving commands, speeds, and changes of speeds in response to the driving commands at different points in time represented by one or more command cycles. Command delay candidates for the autonomous vehicle are determined, each of the command delay candidates represented by one or more command cycles. For each of the command delay candidates, a percentage is calculated for driving commands that resulted in a response of the autonomous vehicle conforming to the driving commands associated with the command delay candidate. One of the command delay candidates having the highest percentage of conformity is selected as the command delay for the autonomous vehicle. The command delay is utilized to plan and control subsequent operations of the autonomous vehicle.

24 Claims, 9 Drawing Sheets

(56) References Cited

U.S. PATENT DOCUMENTS

| | | | |
|---|---|---|---|
| 2016/0009291 A1* | 1/2016 | Pallet | B60W 50/082 |
| | | | 701/23 |
| 2016/0328976 A1* | 11/2016 | Jo | F02D 41/403 |
| 2017/0169208 A1* | 6/2017 | Jantz | G06F 21/44 |
| 2017/0192436 A1* | 7/2017 | Min | G05D 1/0276 |
| 2017/0227960 A1* | 8/2017 | Joyce | G05D 1/0061 |
| 2017/0261974 A1* | 9/2017 | Ebe | G05D 1/0005 |
| 2017/0261975 A1* | 9/2017 | Liu | H04B 10/116 |
| 2017/0329332 A1* | 11/2017 | Pilarski | G05D 1/0088 |
| 2017/0344004 A1* | 11/2017 | Foster | G05D 1/0088 |

* cited by examiner

| Timestamp/Command Cycles 501 | T1 | T2 | T3 | T4 | T5 | ... | Tn |
|---|---|---|---|---|---|---|---|
| Vehicle Speed 502 | 5 | 6 | 5 | 6 | 5 | ... | |
| Throttle Command Memory 503 | 1 | 0 | 1 | 1 | 1 | ... | |
| Acceleration 504 | 1 | -1 | 1 | -1 | NA | ... | |
| Conformity for one-cycle delay candidate 505 | NA | 0 | 1 | 0 | NA | ... | |
| Conformity for two-cycle delay candidate 506 | NA | NA | 1 | 1 | NA | ... | |
| ... | ... | ... | ... | ... | ... | ... | |

FIG. 5

METHOD FOR DETERMINING COMMAND DELAYS OF AUTONOMOUS VEHICLES

TECHNICAL FIELD

Embodiments of the present invention relate generally to operating autonomous vehicles. More particularly, embodiments of the invention relate to determining command delays of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, speed control is also a critical step in autonomous driving. However, an autonomous driving vehicle (ADV) varies from vehicle to vehicle. It is difficult to determine a speed control command delay between the time of issuing the command and the time of a response from the ADV.

BRIEF DESCRIPTION OF THE DRAWINGS

Embodiments of the invention are illustrated by way of example and not limitation in the figures of the accompanying drawings in which like references indicate similar elements.

FIG. 5 is a diagram illustrating a portion of driving statistics according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, driving statistics of various autonomous vehicles (also referred to as autonomous driving vehicles or ADVs) of a particular type or category are collected over a period of time, where the driving statistics may be captured and recorded by a processing logic of each ADV while the ADV was driven, autonomously or manually by a human driver. The driving statistics may include information concerning the driving commands (e.g., throttle, brake, or steering command), the time of issuing such driving commands, vehicle behaviors at different points in time (e.g., in response to the driving commands), and/or a response of the vehicle derived from the vehicle behaviors at different points in time.

A list of the predetermined command delay candidates for the ADV is determined or defined. Each command delay candidate is represented by one or more command cycles. For example, if a driving command is issued every 0.1 seconds, a command cycle is 0.1 seconds. Thus, a command candidate may be represented by one or multiple of 0.1 seconds. For each of the command delay candidates, a percentage of driving commands (e.g., throttle, brake, or steering commands) is calculated, which resulted in a response of the ADV conforming to the driving commands associated with the command delay candidate in question. After all of the percentages of the responses conforming to the driving commands for all command delay candidates have been determined, a command delay candidate having the highest percentage is selected as the command delay for the particular type of the ADV. Thereafter, the command delay can be utilized to generate planning and control data for controlling and driving an ADV of the same or similar type.

Figure 1:
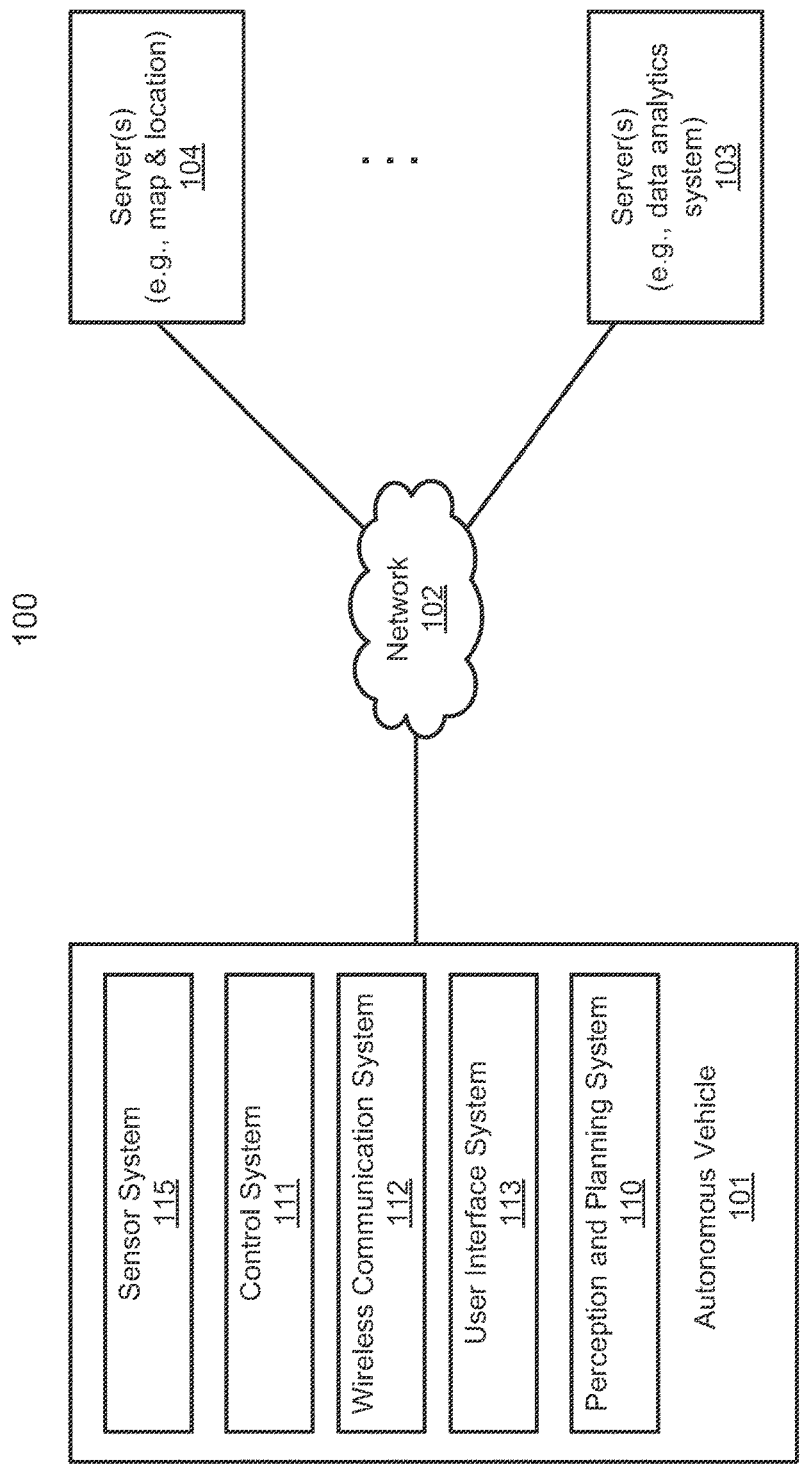
FIG. 1 is a block diagram illustrating a networked system according to one embodiment of the invention.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
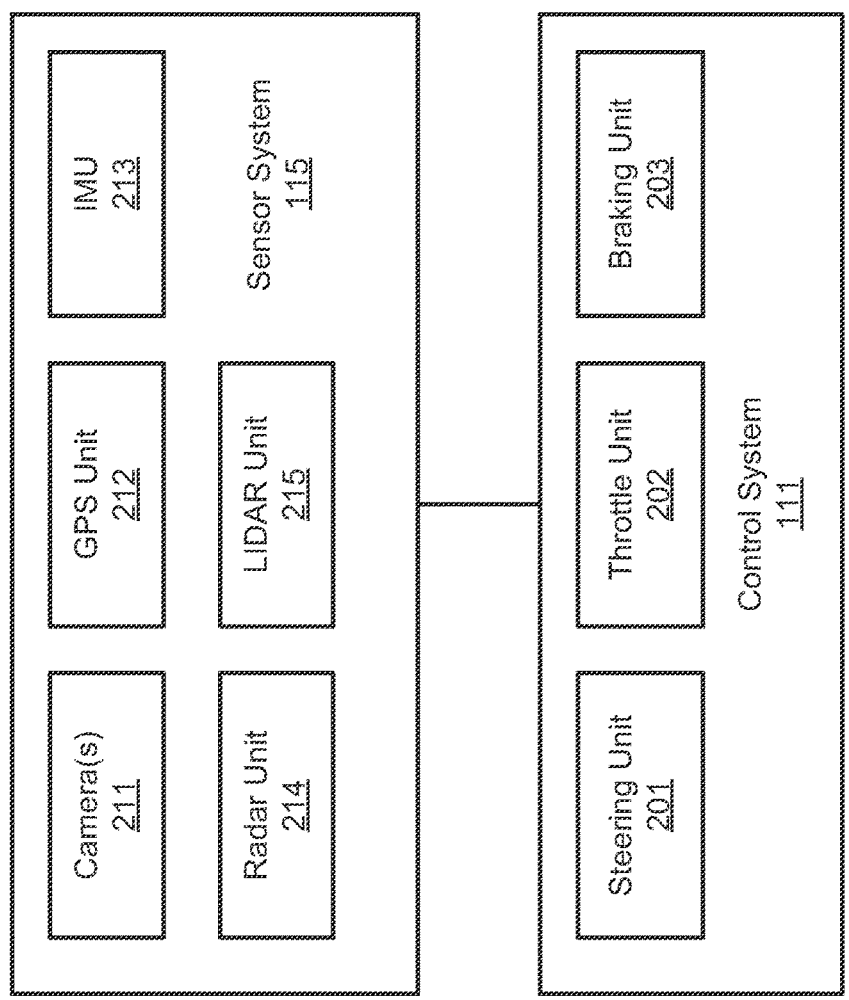
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Figure 3:
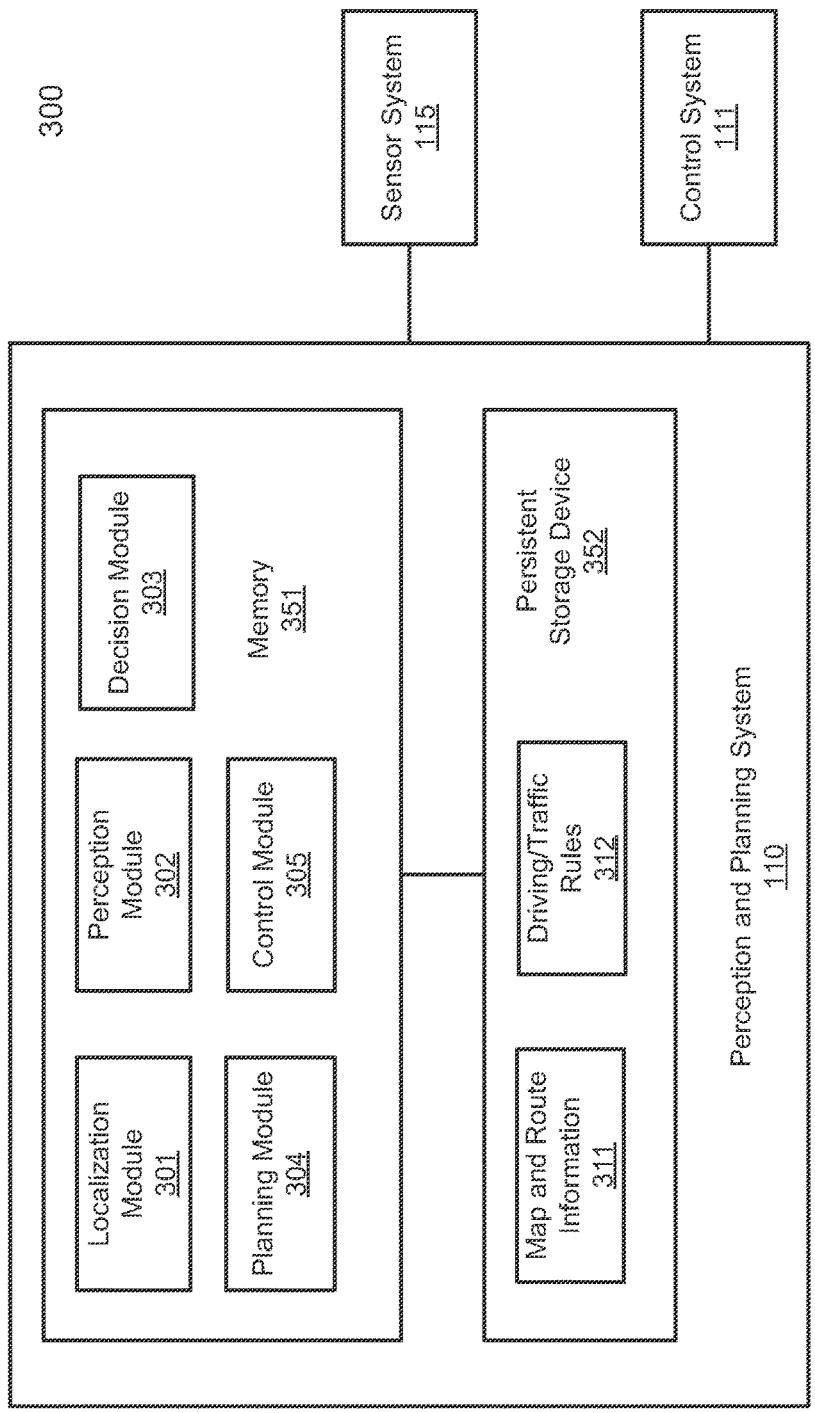
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
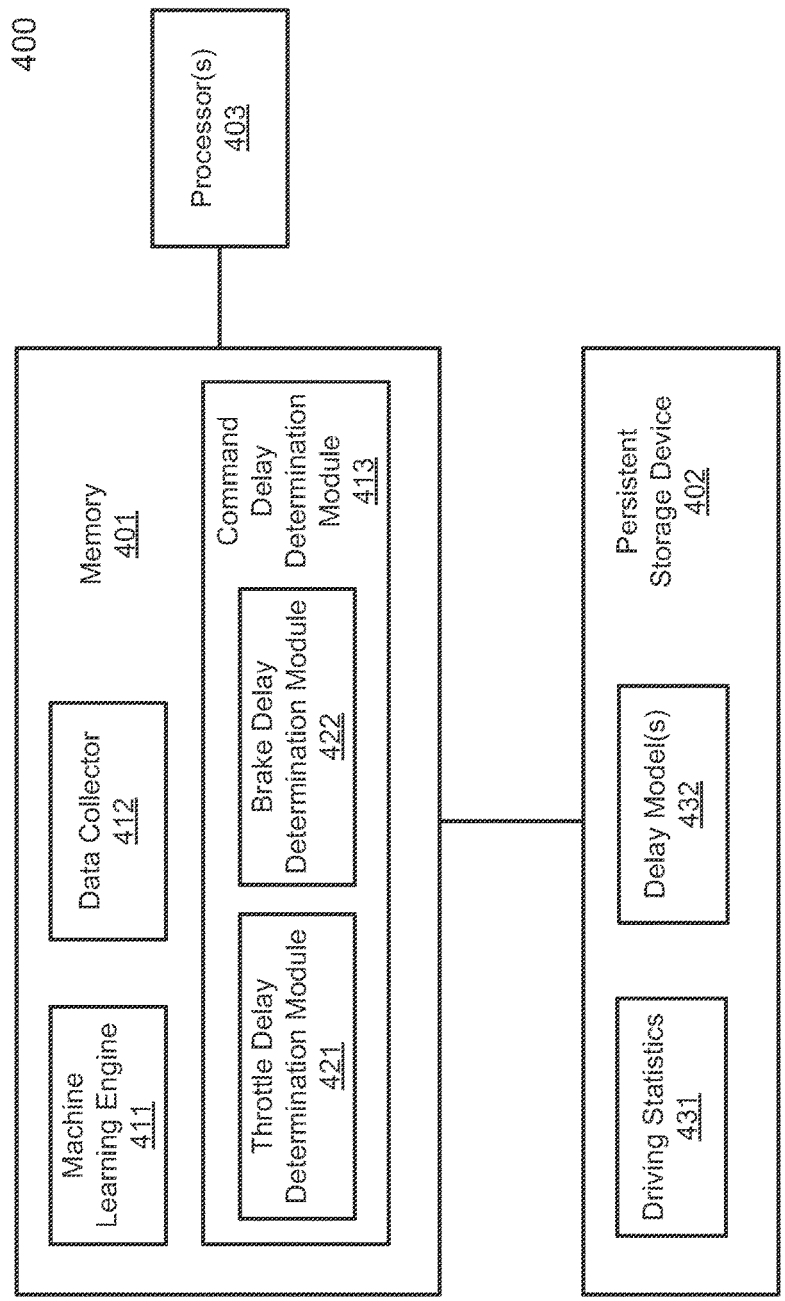
FIG. 4 is a block diagram illustrating a data processing system for determining command delays of an autonomous vehicle according to one embodiment of the invention.

FIG. 4 is a block diagram illustrating a data processing system for determining command delays of an autonomous vehicle according to one embodiment of the invention. System 400 may be implemented as a dedicated data analytics system such as data analytics system or server 103 of FIG. 1. Referring to FIG. 4, system 400 includes, but is not limited to, machine learning engine 411, data collector 412, and command delay determination module or calculator 413, which may be loaded from persistent storage device 401 into memory 401 and executed by one or more processors 403.

In one embodiment, data collector 412 collects driving statistics 431 from a number of vehicles of the same type or similar types, where the driving statistics were captured and recorded by a variety of sensors or recording systems of the vehicles. Such vehicles may be autonomous driving vehicles and/or regular vehicles driven by human drivers. The driving statistics 431 may include information identifying certain driving commands (e.g., throttle, brake, steering commands) issued at certain points in time or command cycles, vehicle speeds or directions captured at different points in times, etc. Based on driving statistics 431, machine learning engine 411 analyzes statistics to learn the vehicle behaviors in response to the driving commands.

In one embodiment, machine learning engine 411 generates command delay predictive model or command delay determination algorithm 432. Command delay predictive model or algorithm 432 can be utilized by command delay determination module 413 to predict or determine a command delay for a particular type of autonomous vehicles. A command delay refers the time delay between the time of issuing a driving command (e.g., throttle, brake, steering commands) and the time of a response of the vehicle. A delay for a different command may be different. For example, a delay for a throttle command may be different than a delay for a brake command or a steering command. In one embodiment, command delay determination module 413 includes throttle delay determination module 421, brake delay determination module 422, a steering delay determination module (not shown) to determine the delays for a throttle command, a brake command, or a steering command, respectively.

Figure 6:
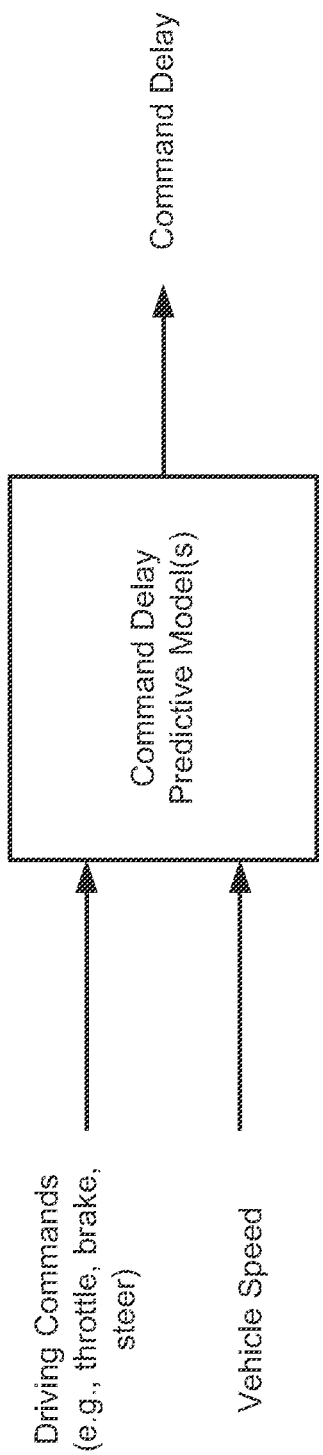
FIG. 6 is a block diagram illustrating a command delay predictive model according to one embodiment of the invention.

For command delay predictive model 432, at least a portion of driving statistics 431 can be fed into the command delay predictive model 432 and the output of command delay predictive model 432 represents the predicted command delay, for example, as shown in FIG. 6. Alternatively, command delay determination module 413 may calculate the command delay based on the driving statistics 431 using a delay determination formula or algorithm. The delay determination formula or algorithm may be derived based on the prior driving statistics of a variety of vehicles.

In one embodiment, a list of the predetermined command delay candidates for the ADV is determined or defined. Each command delay candidate is represented by one or more command cycles. For example, if a speed control command is issued every 0.1 seconds, a command cycle is 0.1 seconds. Thus, a command candidate may be represented by one or multiple of 0.1 seconds. For each of the command delay candidates, command delay determination module 413 calculates a percentage of driving commands (e.g., speed control commands), which resulted in a response (e.g., change of the speed or direction) of the ADV conforming to the driving commands associated with the command delay candidate in question.

The term of "conforming" refers to whether the response of the vehicle is an expected response in response to a particular type of commands. For example, if a driving command is a throttle command, the vehicle is expected to accelerate at some points, after a command delay. Similarly, if the driving command is a brake command, the vehicle is expected to decelerate. If the driving command is a steering command, the vehicle is expected to turn in a direction specified in the steering command. Otherwise, the vehicle is deemed to be nonconforming.

The percentage or ratio of changing of speeds of the vehicle conforming to the speed commands for a delay candidate represents a probability of that delay candidate to be the command delay for the autonomous vehicle. After all of the percentages of the speed changes conforming to the driving commands for all command delay candidates have been determined, a command delay candidate having the highest percentage is selected as the command delay for the particular type of the ADV. Thereafter, the command delay can be utilized to generate planning and control data for controlling and driving an ADV of the same or similar type.

FIG. 5 is a diagram illustrating a portion of driving statistics according to one embodiment of the invention. Referring to FIG. 5, statistics 500 may represent at least a portion of driving statistics 431 of FIG. 4. Specifically, in this example, statistics 500 may be extracted from overall driving statistics 431 that are only related to throttle commands and the responses from the autonomous vehicle for the purpose of determining the throttle command delay. However, the same or similar techniques can be applied to determine delays for other types of commands, such as brake or steering commands. In one embodiment, certain driving statistics captured at different points in response to various throttle commands are extracted. In this example, for a predetermined set of points in time, represented by command cycles or timestamps 501, vehicle speeds 502 are identified from the driving statistics. In addition, throttle commands 503 issued at different points are also identified.

In this particular example, the vehicle speeds 502 at commands cycles T1 to T5 are 5, 6, 5, 6, and 5, respectively. The throttle commands issued for the same command cycles are 1, 0, 1, 1, and 1, respectively. Note that the numbers as shown herein are utilized for the purpose of illustration only; they are not meant to be the actual data. For a throttle command, a positive number represents a throttle command with non-zero value has been applied, i.e., a percentage of a full acceleration pedal pressure. A zero number indicates that no acceleration pressure has been applied, in which case the vehicle may be moving based on a command issued in a previous command cycle or moving at a constant speed. The vehicle can be accelerating or decelerating dependent upon the previous command.

Based on the vehicle speeds captured at different points in time represented by commands cycles 501, whether the vehicle was accelerating or decelerating at a particular point in time can be determined in a form of acceleration indicator 504. In this example, at command cycle T1, vehicle speed changed from 5 at T1 to 6 at T2. Thus the acceleration indicator 504 corresponding to command cycle T1 is positive, in this example as 1 or logical 1 (true). The positive value indicates that the vehicle was accelerating, while a negative value such as −1 at T4 indicates that the vehicle was decelerating. Similarly, acceleration indicator 504 for T2 to T4 can be determined as −1 (speed changed from 6 at T2 to 5 at T3), 1 (speed changed from 5 at T3 to 6 at T4), and −1 (speed changed from 6 at T4 to 5 at T5), respectively, based on their speeds changed from a previous command cycle.

In one embodiment, for each of the predetermined command delay candidates as a target delay candidate, throttle command delay determination module 421 determines which vehicle responses in a form of speed changes conform to the corresponding throttle command issued in a command cycle prior to the target delay candidate. In one embodiment, module 421 determines a command value of a driving command issued at a first command cycle. Module 421 further determines a response value of a response of the autonomous vehicle occurred at a second command cycle in response to the driving command. Module 421 determines the conformity of the response in response to the driving command based on the command value and the response value.

The difference between the first command cycle and the second command cycle represents the command delay candidate in question. A driving command can be a throttle command or a brake command. A response (e.g., change of speed) is conformed to a throttle command, if the autonomous vehicle is accelerating at the second command cycle in response to the throttle command issued at the first command cycle. Similarly, a response is conformed to a brake command, if the autonomous vehicle is decelerating at the second command cycle in response to the brake command issued at the first command cycle. The same process can also be applied to steering commands.

In this example, for a delay candidate of one command cycle 505, the conformities of speed changes on T2, T3, and T4 are determined. As described above, when throttle command 503 is positive, the vehicle is expected to accelerate after the command delay. When the throttle command 503 is zero, it can applied to either acceleration, deceleration, or none. For this exercise, it will be interpreted as positive for throttle commands or negative for brake commands. The goal of the analyzing the driving statistics is to determine the command delay for the type of the vehicle.

In this example, for the purpose of illustration, only command cycles T1 to T5 are considered. However, more command cycles can be considered. In fact, more command cycles considered, more accurate the result will be. For one-cycle delay candidate 505 (e.g., a command delay of one cycle), the conformities for T2, T3, and T4 can be determined by examining the acceleration indicator 504 in view of the throttle command 503 at different command cycles. In this example, since acceleration indicator at T2 is −1 and the throttle command 503 issued at T1 is 1, the conformity for T1 will be 0 (false). It indicates that the change of speed (e.g., acceleration) of the vehicle at T2 does not conform to the throttle command issued at T1. Since acceleration indicator at T3 is 1 and the throttle command 503 issued at T2 is 0, the conformity for T3 will be 1 (true). It indicates that the change of speed (e.g., acceleration) of the vehicle at T3 conforms to the throttle command issued at T2.

Thus, for one-cycle delay candidate 505 (e.g., a command delay of one cycle), the conformities for command cycles T2, T3, and T4 are 0 (false), 1 (true), and 0 (false). Therefore, the percentage of the conformities that are non-zero (or true) is ⅓, approximately 33%. Such a percentage represents the probability that one cycle delay is the command delay for throttle commands for the same or similar type of vehicles. For two-cycle delay candidate 506 (e.g., a command delay of two cycles), the conformities of T3 and T4 are 1 (true) and 1 (true) respectively. Thus the percentage of the conformities that are non-zero (or true) is 2/2 or 100%. Such a percentage represents the probability that two cycle delay is the command delay for throttle commands for the same or similar type of vehicles. The same process can be performed to determine the probability of 3-cycle, 4-cycle, . . . , n-cycle delays, etc.

After the conformity percentages of all delay candidates have been determined, one of the delay candidates having the highest percentage or probability will be selected as the final command delay for the type of vehicles. In this example, two-cycle delay with 100% will be considered the command delay for the vehicle compared to one-cycle delay of 33%. The techniques as shown in FIG. 5 can also be utilized to determine a command delay for brake commands.

Figure 7:
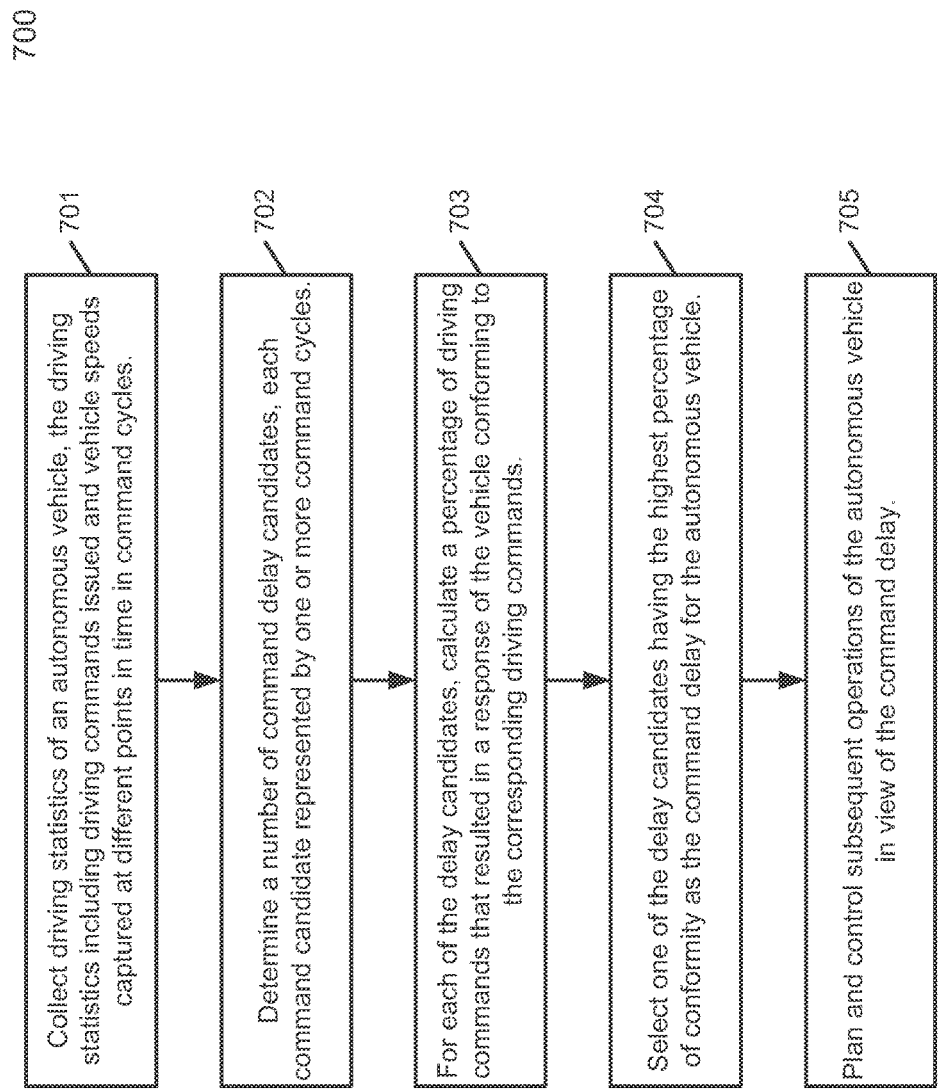
FIG. 7 is a flow diagram illustrating a process of determining delays of commands for operating an autonomous vehicle according to one embodiment of the invention.

FIG. 7 is a flow diagram illustrating a process of determining delays of commands for operating an autonomous vehicle according to one embodiment of the invention. Process 700 may be performed by processing logic which may include software, hardware, or a combination thereof. For example, process 700 may be performed by command delay determination module 413. Referring to FIG. 7, in operation 701, driving statistics of an autonomous vehicle or vehicles of the same or similar type are collected. The driving statistics include driving commands (e.g., throttle, brake, steering commands) and vehicle speeds or directions captured at different points in time. In operation 702, processing logic determines a number of command delay candidates. Each command delay candidate is represented by one or more command cycles.

In operation 703, for each of the command delay candidates, processing logic calculates a percentage of driving commands that resulted in responses (e.g., changes of vehicle speeds or directions) conforming to the driving commands associated with the delay candidate. After all of the percentages of all delay candidates have been calculated, in operation 704, processing logic selects one of the delay candidates having the highest percentage as the final candidate for command delay for the type of the autonomous vehicles. In operation 705, processing logic plan and control subsequent operations of the autonomous vehicle based on the selected command delay.

Figure 8:
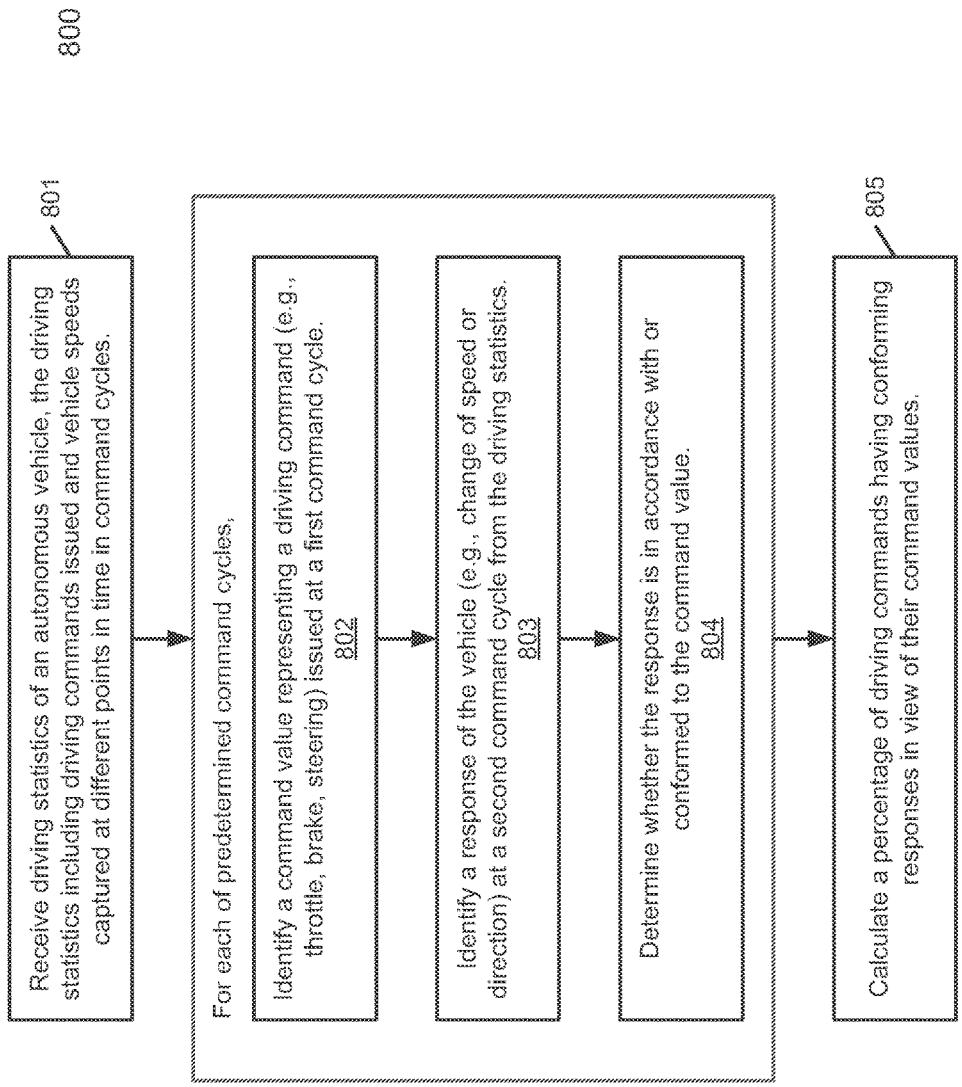
FIG. 8 is a flow diagram illustrating a process of determining delays of commands for operating an autonomous vehicle according to another embodiment of the invention.

FIG. 8 is a flow diagram illustrating a process of determining delays of commands for operating an autonomous vehicle according to another embodiment of the invention. Process 800 may be performed by processing logic which may include software, hardware, or a combination thereof. For example, process 800 may be performed by command delay determination module 413 as part of operations involved in operation 703 of FIG. 7 to calculate a percentage of conforming responses of a particular command delay candidate.

Referring to FIG. 8, in operation 801, driving statistics of an autonomous vehicle or vehicles of the same or similar type are collected. The driving statistics include driving commands and vehicle speeds captured at different points in time represented by command cycles. For each of predetermined command cycles, in operation 802, processing logic identifies a first command value representing a driving command (e.g., throttle, brake, steering commands) issued at a first command cycle In operation, 803, processing logic identifies a response (e.g., change of the speed or direction) of the autonomous vehicle at a second command cycle. The difference between the first command cycle and the second command cycle represents a command delay candidate in question. In operation 804, processing logic determines whether the response of the vehicle is in accordance with or conformed to the command value. In operation 805, processing logic calculates a percentage of driving commands having conforming responses in view of their command values. The percentage represents a probability of the delay candidate to be the command delay for the autonomous vehicle.

Note that the processes of determining command delays described above have been performed by a data analytics system offline based on the driving statistics collected from a variety of vehicles. In some embodiments, such processes can also be performed in at least some of the vehicles online. For example, some of machine learning engine 411, data collector 412, and command delay determination module 413 may be hosted in memory 351 and executed by one or more processors of perception and planning system 110 of an autonomous vehicle as shown in FIG. 3. Data collector 412 may periodically collect driving statistics data from sensor system 115 and store the collected data in persistent storage device 352. Machine learning engine 411 and/or command delay determination module 413 determine command delays (e.g., throttle command delay, brake command delay, steering command delay, etc.) at real-time. Such command delays may be utilized for planning and controlling the vehicle in a subsequent route or route segment, or next command cycle. Although the online processes may require additional processing resources from the vehicle, the command delays may be more accurate, as the command delays may vary given the driving conditions (e.g., road condition, weather condition) at the point in time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
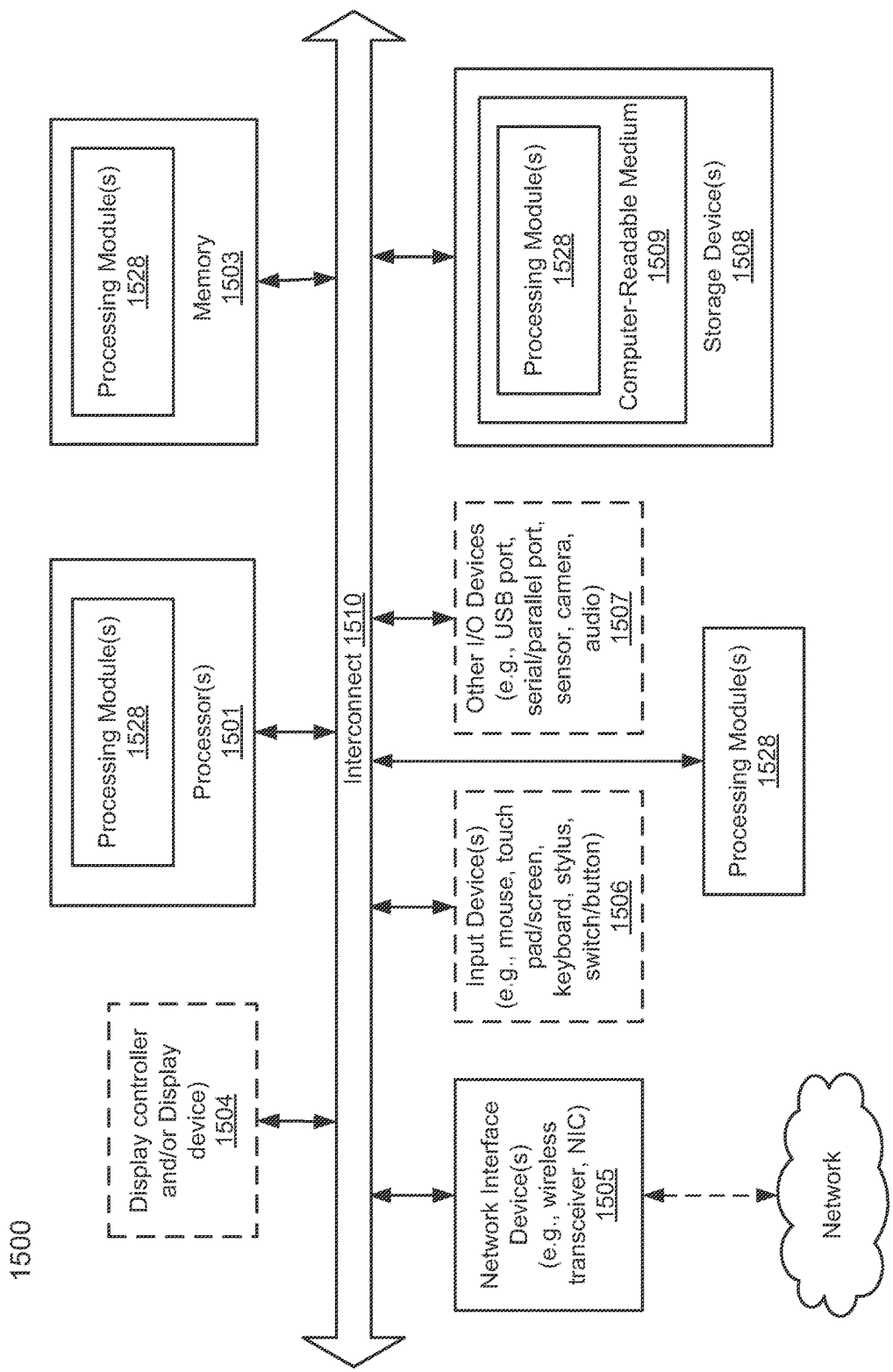
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, machine learning engine 411, data collector 412, or command delay determination module 413. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining command delays of driving commands operating an autonomous vehicle, the method comprising:
    receiving, by a data collector executed by a processor, driving statistics of an autonomous vehicle, the driving statistics including driving commands issued and responses from the autonomous vehicle at different points in time;
    determining, by a command delay determination module executed by the processor, a plurality of command delay candidates for the autonomous vehicle, each of the command delay candidates represented by one or more command cycles associated with the autonomous vehicle;
    for each of the command delay candidates, calculating, by the command delay determination module, a percentage of driving commands that resulted in a response of the autonomous vehicle conforming to the driving commands based on the driving statistics associated with the autonomous vehicle; and
    selecting, by the command delay determination module, one of the command delay candidates having the highest percentage of conformity as the command delay for the autonomous vehicle, wherein the command delay is utilized to plan and control subsequent operations of the autonomous vehicle.

2. The method of claim 1, further comprising, for each of a plurality of driving commands associated with each of the command delay candidates, determining conformity of a response of the autonomous vehicle in response to the driving command.

3. The method of claim 2, wherein determining conformity of a response of the autonomous vehicle in response to the driving command comprises:
    determining a first command value of a first driving command issued at a first command cycle;
    determining a first response value of a first response of the autonomous vehicle occurred at a second command cycle in response to the first driving command; and
    determining conformity of the first response in response to the first driving command based on the first command value and the first response value.

4. The method of claim 3, wherein a difference of the first command cycle and the second command cycle represents one of the command delay candidates.

5. The method of claim 3, wherein the first driving command comprises a throttle command, wherein the first response is conformed to the first driving command if the autonomous vehicle was accelerating at the second command cycle based on the driving statistics.

6. The method of claim 3, wherein the first driving command comprises a braking command, wherein the first response is conformed to the first driving command if the autonomous vehicle was decelerating at the second command cycle based on the driving statistics.

7. The method of claim 3, wherein the first driving command comprises a steering command turning in a first direction, wherein the first response is conformed to the first driving command if the autonomous vehicle was turning in the first direction at the second command cycle based on the driving statistics.

8. The method of claim 1, wherein a command delay is one of a throttle command delay, a braking command delay, or a steering command delay.

9. A non-transitory machine-readable medium having instructions stored therein, which when executed by a processor, cause the processor to perform operations, the operations comprising:
    receiving driving statistics of an autonomous vehicle, the driving statistics including driving commands issued and responses from the autonomous vehicle at different points in time;
    determining a plurality of command delay candidates for the autonomous vehicle, each of the command delay candidates represented by one or more command cycles associated with the autonomous vehicle;
    for each of the command delay candidates, calculating a percentage of driving commands that resulted in a response of the autonomous vehicle conforming to the driving commands based on the driving statistics associated with the autonomous vehicle; and
    selecting one of the command delay candidates having the highest percentage of conformity as the command delay for the autonomous vehicle, wherein the command delay is utilized to plan and control subsequent operations of the autonomous vehicle.

10. The machine-readable medium of claim 9, wherein the operations further comprise, for each of a plurality of driving commands associated with each of the command delay candidates, determining conformity of a response of the autonomous vehicle in response to the driving command.

11. The machine-readable medium of claim 10, wherein determining conformity of a response of the autonomous vehicle in response to the driving command comprises:
    determining a first command value of a first driving command issued at a first command cycle;
    determining a first response value of a first response of the autonomous vehicle occurred at a second command cycle in response to the first driving command; and
    determining conformity of the first response in response to the first driving command based on the first command value and the first response value.

12. The machine-readable medium of claim 11, wherein a difference of the first command cycle and the second command cycle represents one of the command delay candidates.

13. The machine-readable medium of claim 12, wherein the first driving command comprises a throttle command, wherein the first response is conformed to the first driving command if the autonomous vehicle was accelerating at the second command cycle based on the driving statistics.

14. The machine-readable medium of claim 12, wherein the first driving command comprises a braking command, wherein the first response is conformed to the first driving command if the autonomous vehicle was decelerating at the second command cycle based on the driving statistics.

15. The machine-readable medium of claim 12, wherein the first driving command comprises a steering command turning in a first direction, wherein the first response is conformed to the first driving command if the autonomous vehicle was turning in the first direction at the second command cycle based on the driving statistics.

16. The machine-readable medium of claim 9, wherein a command delay is one of a throttle command delay, a braking command delay, or a steering command delay.

17. A data processing system, comprising:
a processor; and
a memory coupled to the processor to store instructions, which when executed by the processor, cause the processor to perform operations, the operations including
receiving driving statistics of an autonomous vehicle, the driving statistics including driving commands issued and responses from the autonomous vehicle at different points in time,
determining a plurality of command delay candidates for the autonomous vehicle, each of the command delay candidates represented by one or more command cycles associated with the autonomous vehicle,
for each of the command delay candidates, calculating a percentage of driving commands that resulted in a response of the autonomous vehicle conforming to the driving commands based on driving statistics associated with the autonomous vehicle, and
selecting one of the command delay candidates having the highest percentage of conformity as the command delay for the autonomous vehicle, wherein the command delay is utilized to plan and control subsequent operations of the autonomous vehicle.

18. The system of claim 17, wherein the operations further comprise, for each of a plurality of driving commands associated with each of the command delay candidates, determining conformity of a response of the autonomous vehicle in response to the driving command.

19. The system of claim 18, wherein determining conformity of a response of the autonomous vehicle in response to the driving command comprises:
determining a first command value of a first driving command issued at a first command cycle;
determining a first response value of a first response of the autonomous vehicle occurred at a second command cycle in response to the first driving command; and
determining conformity of the first response in response to the first driving command based on the first command value and the first response value.

20. The system of claim 19, wherein a difference of the first command cycle and the second command cycle represents one of the command delay candidates.

21. The system of claim 19, wherein the first driving command comprises a throttle command, wherein the first response is conformed to the first driving command if the autonomous vehicle was accelerating at the second command cycle based on the driving statistics.

22. The system of claim 19, wherein the first driving command comprises a braking command, wherein the first response is conformed to the first driving command if the autonomous vehicle was decelerating at the second command cycle based on the driving statistics.

23. The system of claim 19, wherein the first driving command comprises a steering command turning in a first direction, wherein the first response is conformed to the first driving command if the autonomous vehicle was turning in the first direction at the second command cycle based on the driving statistics.

24. The system of claim 17, wherein a command delay is one of a throttle command delay, a braking command delay, or a steering command delay.

* * * * *